UNITED STATES PATENT OFFICE.

CHILION B. ALLEN, OF ST. LOUIS, MISSOURI.

IMPROVED ROOFING COMPOSITION.

Specification forming part of Letters Patent No. 69,889, dated October 15, 1867.

*To all whom it may concern:*

Be it known that I, CHILION B. ALLEN, of St. Louis, in the county of St. Louis, and in the State of Missouri, have invented certain new and useful Improvements in Plastic Slate for Roofing and other Purposes; and do hereby declare that the following is a full, clear, and exact description thereof.

My invention consists in the admixture of certain ingredients for composing a composition roofing, such as is placed upon the roofs of houses, for boat-docks, felly-boards, or other places, and can be used in quantities to suit the different purposes for which it is to be used.

It will be found necessary to admix the ingredients of different consistencies for the various purposes intended.

The component parts are substantially as follows: coal-tar, plaster, molders' sand, and the common clay. These may be put together in any suitable quantities, and when mixed will compose a cement into which water will not penetrate, and, while being sufficiently stiff (when dry) to prevent the ingress of water, &c., will not crack in cold weather, nor melt and "run" in the heat of summer.

Having thus fully described my invention, what I claim as new, and desire to secure by Letters Patent, is—

The within-described composition, composed of the articles herein set forth, and used for the purposes specified.

In testimony that I claim the foregoing I have hereunto set my hand this 14th day of March, 1867.

CHILION B. ALLEN.

Witnesses:
FRANK E. BROWN,
CHAS. F. WOOD.